US008975518B1

United States Patent
Gretz

(10) Patent No.: US 8,975,518 B1
(45) Date of Patent: *Mar. 10, 2015

(54) TWO-GANG PRE-WIRED TV BRIDGE KIT

(71) Applicant: Thomas J. Gretz, Port St. Lucie, FL (US)

(72) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/944,136

(22) Filed: Jul. 17, 2013

Related U.S. Application Data

(63) Continuation-in-part of application No. 13/385,395, filed on Feb. 18, 2012, now Pat. No. 8,658,895, and a continuation-in-part of application No. 12/660,745, filed on Mar. 3, 2010, now Pat. No. 8,563,876.

(60) Provisional application No. 61/674,031, filed on Jul. 20, 2012.

(51) Int. Cl.
| | |
|---|---|
| H01H 9/02 | (2006.01) |
| H01H 13/04 | (2006.01) |
| H01H 19/04 | (2006.01) |
| H01H 21/04 | (2006.01) |
| H01H 23/04 | (2006.01) |
| H01J 5/00 | (2006.01) |
| H01J 15/00 | (2006.01) |
| H02G 3/08 | (2006.01) |
| H01R 13/46 | (2006.01) |
| H05K 5/00 | (2006.01) |
| H01R 13/502 | (2006.01) |
| H02G 3/04 | (2006.01) |
| H05K 5/03 | (2006.01) |

(52) U.S. Cl.
CPC .................................. *H02G 3/086* (2013.01)
USPC .............. 174/53; 174/50; 174/520; 174/559; 174/58; 174/66

(58) Field of Classification Search
USPC ........... 174/50, 520, 559, 560, 561, 562, 563, 174/53, 54, 55, 56, 57, 58, 61, 66, 67
See application file for complete search history.

(56) References Cited

U.S. PATENT DOCUMENTS

| | | | | |
|---|---|---|---|---|
| 6,147,304 | A | * 11/2000 | Doherty | 174/481 |
| 6,444,906 | B1 | 9/2002 | Lewis | |
| 6,753,471 | B2 | 6/2004 | Johnson et al. | |
| 6,872,887 | B2 | 3/2005 | Shotey et al. | |
| 7,078,618 | B2 | 7/2006 | Dinh | |
| 7,304,236 | B1 * | 12/2007 | Gretz | 174/58 |
| 7,390,977 | B2 * | 6/2008 | Hill | 174/480 |
| 7,525,043 | B1 * | 4/2009 | Gretz | 174/50 |
| 7,989,699 | B1 | 8/2011 | Shotey et al. | |
| 2013/0056259 | A1 * | 3/2013 | Lettkeman | 174/505 |

* cited by examiner

*Primary Examiner* — Hoa C Nguyen
*Assistant Examiner* — Binh Tran

(57) ABSTRACT

A two-gang pre-wired TV bridge kit including a kit, package, or assembly of components for mounting a TV to a wall with minimal disruption to the wall surface. The kit includes a fully assembled two-gang pre-wired electrical box with a pre-wired receptacle, a pre-wired junction box including a flexible cord connected thereto by a cord grip fitting, a trim plate and a cover plate. The cord grip fitting enables a secure connection between the pre-wired electrical box and the flexible cable that is permanently secured to the electrical box. The trim plate includes deep sidewalls for creating a recessed area for positioning the junction box behind the wall surface and rotatable flags for securing the junction box to wallboard. A cover plate secures to the trim plate within the recessed area. The flexible cord is plugged into an existing electrical outlet to feed electricity to the pre-wired receptacle.

15 Claims, 7 Drawing Sheets

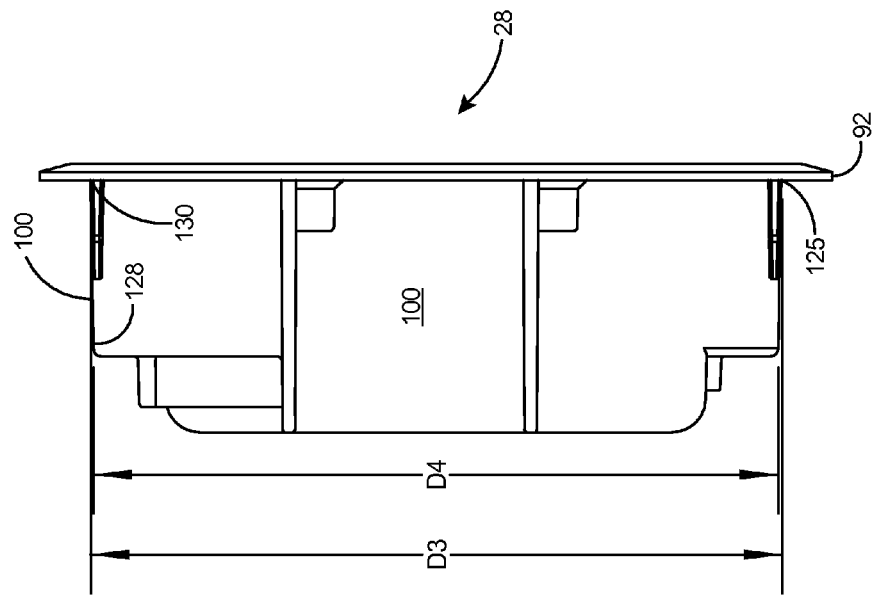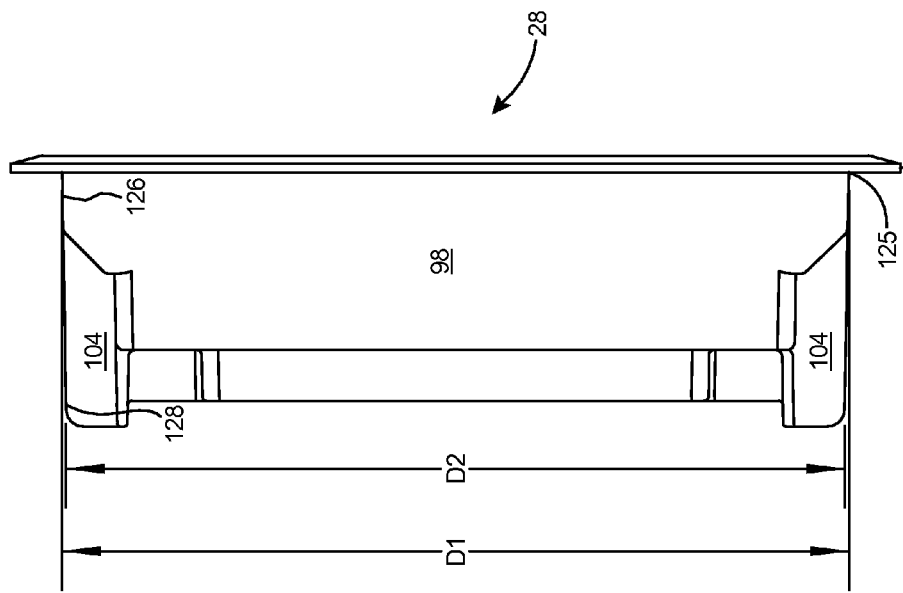

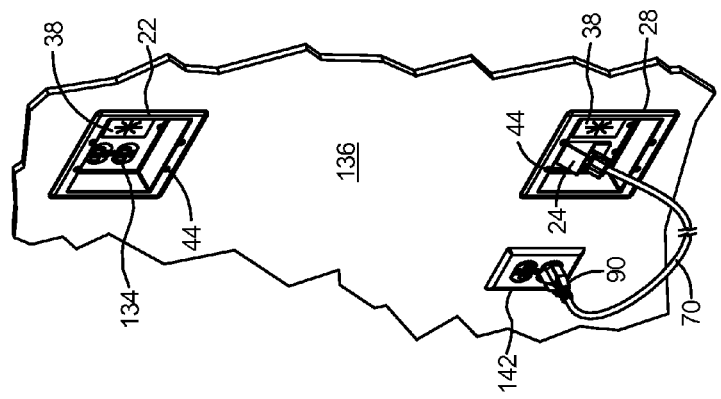
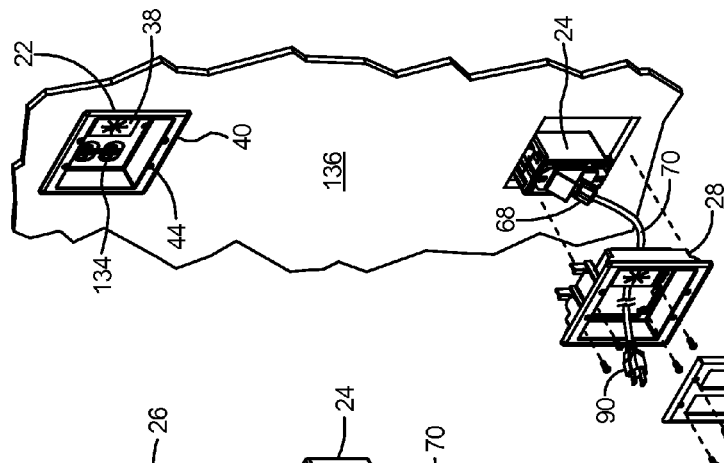
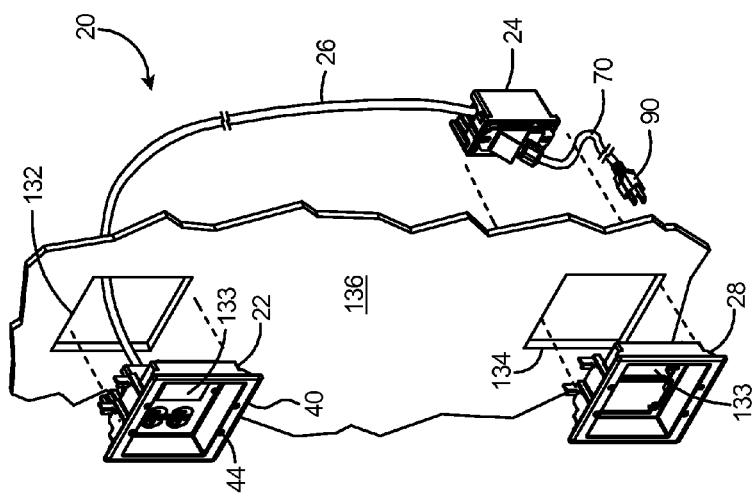

TWO-GANG PRE-WIRED TV BRIDGE KIT

CROSS-REFERENCE TO RELATED APPLICATIONS

This application claims priority to provisional U.S. Application No. 61/674,031, filed Jul. 20, 2012, and is a Continuation-In-Part of U.S. patent application Ser. No. 13/385,395 filed Feb. 18, 2012 and still pending, which is a Continuation-In-Part of U.S. patent application Ser. No. 12/660,745 filed Mar. 3, 2010 and still pending, the entire contents of which all of said applications are incorporated herein by reference.

FIELD OF THE INVENTION

This invention relates to the installation of electrical components and specifically to two-gang pre-wired television (TV) bridge kit that eliminates the need to disturb wall studs and minimizes the amount of time required by an installer to provide electrical service and low voltage connections on a wall for the mounting of a flat panel TV or similar device thereto.

BACKGROUND OF THE INVENTION

Commonly owned U.S. application Ser. No. 13/385,395, filed Feb. 18, 2012 provided a two-gang pre-wired TV bridge kit for enabling a homeowner to rapidly install an electrical outlet on a wall while eliminating damage to the wall surface. The two-gang pre-wired TV bridge kit enabled a homeowner to rapidly connect electrical feed from an existing electrical outlet to a wall mounted TV or similar electrical device. The two-gang pre-wired TV bridge kit vastly simplified and minimized the time for installing power to a wall-mounted TV and eliminated the need to remove drywall, drill studs, and feed electrical supply cable through the studs in order to power the electrical device.

Although the two-gang pre-wired TV bridge kit provided a kit that vastly simplified the task of providing power to a wall-mounted TV or similar electrical device, the two-gang pre-wired TV bridge kit of the parent application could be improved by adding functionality to enable supplying communications signals to the device such as CATV cables for carrying the TV signal or the cabling for a surround sound system connected to the TV.

What is needed therefore is a device and method for supplying power and low voltage connections to a wall-mounted TV. Such a device should eliminate the need for altering the surrounding wall surface and underlying studs, eliminate the need to pull power and low voltage cables through adjacent studs in the wall, and eliminate the need to make extensive repairs to the drywall and wall surface after the cables are installed.

SUMMARY OF THE INVENTION

The invention is a two-gang pre-wired TV bridge kit including a kit, package, or assembly of components for mounting a TV to a wall with minimal disruption to the wall surface. The kit includes a fully assembled two-gang pre-wired electrical box with a pre-wired receptacle and a pre-wired junction box with cord grip and flexible cord. The cord grip fitting enables a secure connection between the two-gang pre-wired electrical box and the flexible cable that is permanently secured to the electrical box to reverse feed power to the first pre-wired junction box. The pre-wired junction box includes a trim plate with deep sidewalls for creating a recessed area for positioning the junction box a substantial distance from the wall surface. The trim plate includes rotatable flags for securing the junction box to the wallboard. A cover plate secures to the trim plate within the recessed area. The flexible cord is plugged into an existing electrical outlet to reverse feed electricity from the existing electrical outlet into the two-gang pre-wired TV bridge kit.

OBJECTS AND ADVANTAGES

Several advantages are achieved with the two-gang pre-wired TV bridge kit of the present invention, including:
(1) The two-gang pre-wired TV bridge kit vastly simplifies the task of providing power and low voltage signals such as CATV to a wall-mounted TV by eliminating the need to remove drywall or disrupt the wall surface surrounding the TV.
(2) As all electrical connections are pre-wired, the two-gang pre-wired TV bridge kit enables a homeowner to easily and rapidly install electrical supply and low voltage cables to a wall-mounted electrical device such as a TV.
(3) The two-gang pre-wired TV bridge kit eliminates the need to alter underlying studs in order to supply electricity or signal feeds to a wall-mounted TV.
(4) The two-gang pre-wired TV bridge kit completely eliminates the need to pull electrical cables through adjacent studs in the wall in order to power the TV in the desired location.
(5) The two-gang pre-wired TV bridge kit provides a means of powering a TV without damaging surrounding wall surfaces.
(6) The two-gang pre-wired TV bridge kit eliminates unsightly visible cables surrounding any wall-mounted TV to which it supplies power.

These and other objects and advantages of the present invention will be better understood by reading the following description along with reference to the drawings.

DESCRIPTION OF THE DRAWINGS

FIG. 6 is a side view of the trim plate.

FIG. 7 is a top view of the trim plate.

FIGS. 9a, 9b, and 9c are conceptual schematics depicting the installation sequence of the two-gang pre-wired TV bridge kit of the present invention to form a bridge between the pre-wired receptacle and an existing wall outlet.

DETAILED DESCRIPTION OF THE INVENTION

Figure 1:
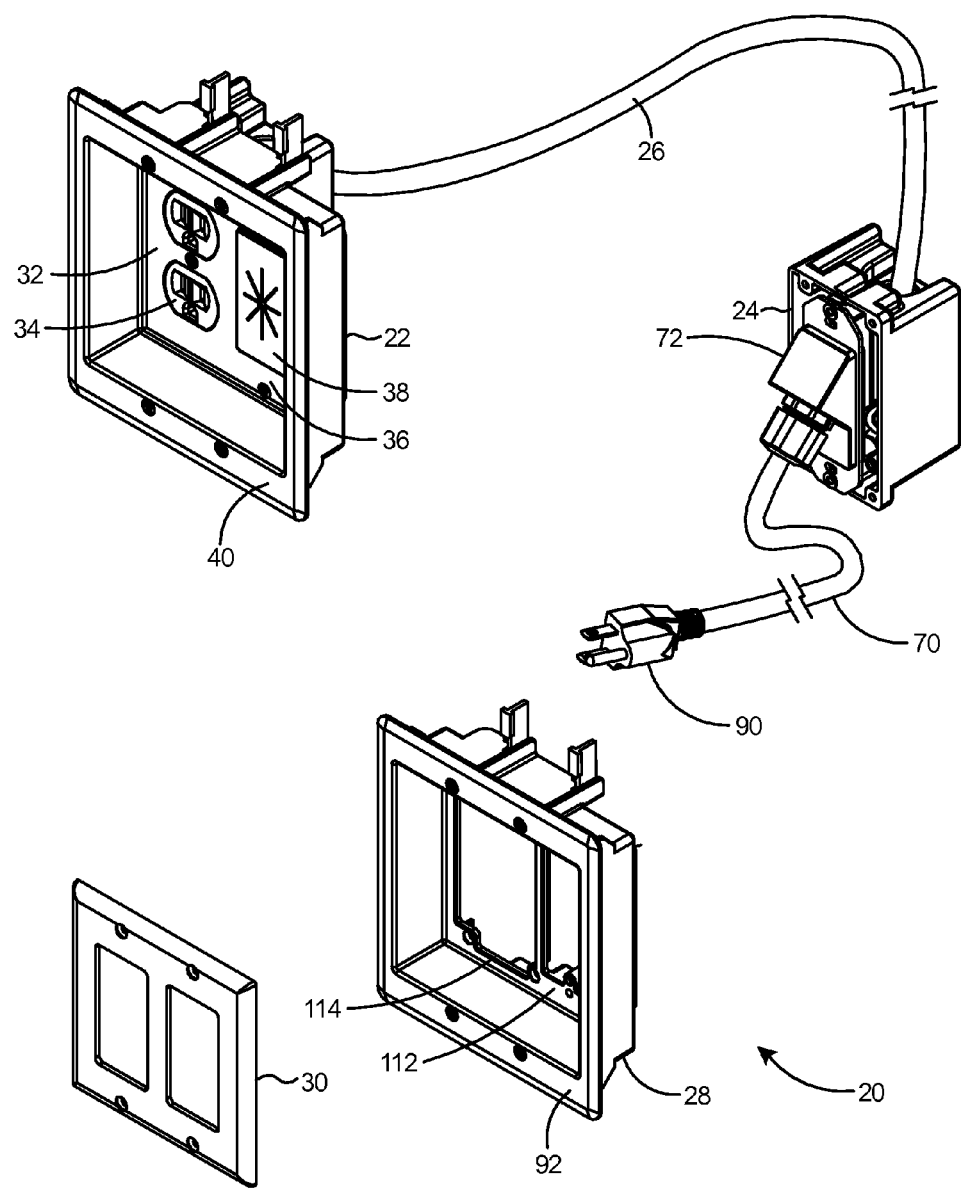
FIG. 1 is a perspective view of a two-gang pre-wired TV bridge kit according to the present invention.

Referring to FIG. 1 there is shown a preferred embodiment of a two-gang pre-wired TV bridge kit 20 according to the present invention. The two-gang pre-wired TV bridge kit 20 is an assembly of electrical components, many of them pre-wired to provide a simple and efficient means to rapidly provide electrical power and low voltage cables to a homeowner's chosen location for mounting a flat panel TV or similar electrical device. The two-gang pre-wired TV bridge kit 20 includes two pre-wired electrical boxes including a first electrical box 22 and a second electrical box 24 that are pre-wired to each other and connected by electrical cable 26. The bridge kit 20 includes a trim plate 28 and a cover plate 30.

Figure 2:
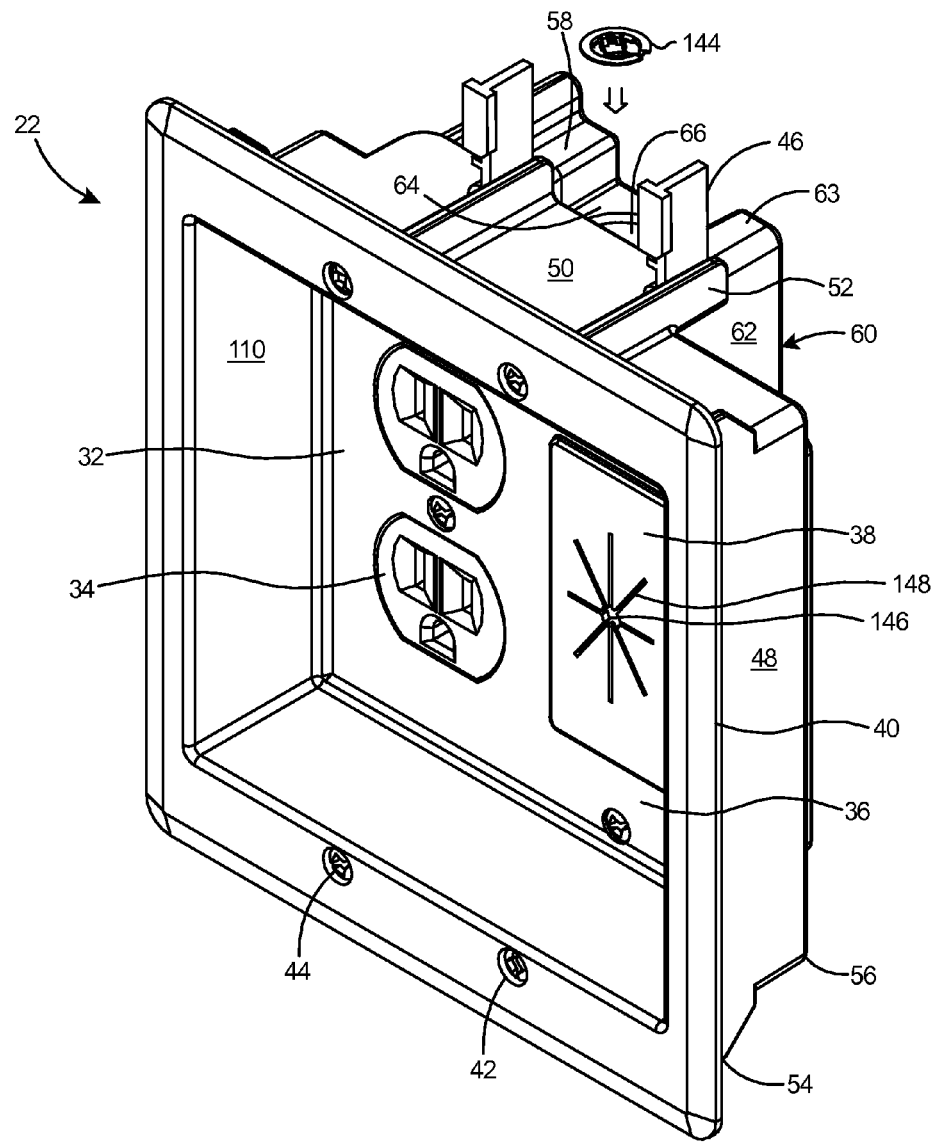
FIG. 2 is a perspective view of a fully assembled two-gang pre-wired electrical box with a pre-wired receptacle that forms a portion of the two-gang pre-wired TV bridge kit of FIG. 1.

With reference to FIG. 2, first electrical box 22 is a two-gang box that includes a high voltage side 32 including a pre-wired receptacle 34 and a low voltage side 36 including a flexible insert 38. The two-gang box 22 includes an integral flange 40 with apertures 42 there through and flag screws 44 extending through the apertures 42 and attached to rotatable flags 46. The first box 22 includes sides 48 and ends 50 with rails 52 on the ends extending from the front 54 to the rear 56 of the first box 22. The rotatable flags 46 are located adjacent the rails 52. The high voltage side 32 of first electrical box 22 includes an electrical junction box 58 including a back wall 60, side walls 62, end walls 63, and a recessed area 64 with a knockout 66 therein.

Figure 3:
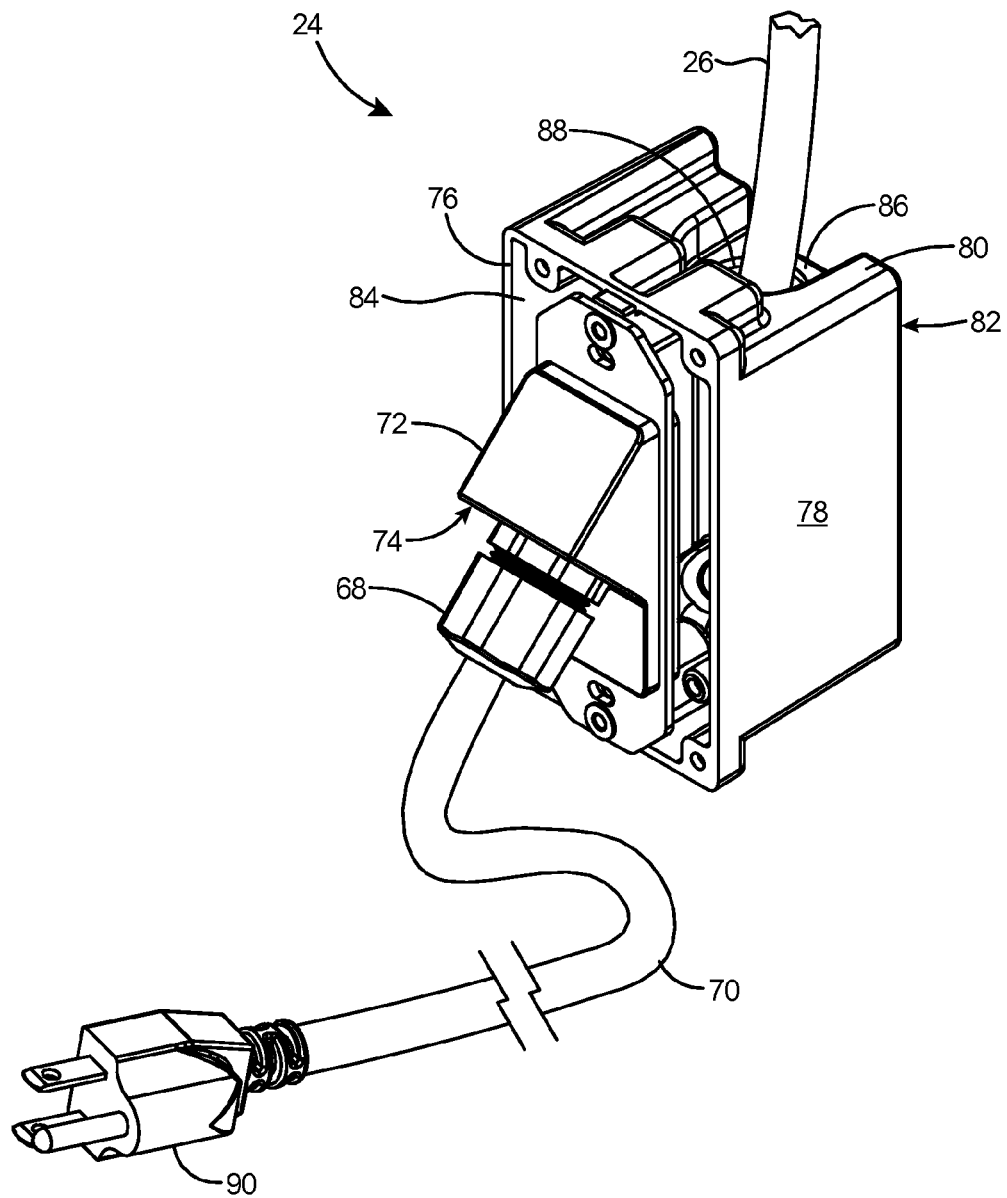
FIG. 3 is a perspective view of a pre-wired junction box with cord grip and flexible cord that forms a portion of the two-gang pre-wired TV bridge kit of FIG. 1.

Referring to FIG. 3, second electrical box 24 is a pre-wired high voltage junction box that is pre-wired with a cord grip 68 and a flexible cord 70. The cord grip 68 is secured to a cord grip mount 72 which includes a 45° surface 74 for angling cord grip 68 at a 45° angle with respect to the front face 76 of the second box 24. Second electrical box 24 includes side walls 78, end walls 80, and a back wall 82 defining a high voltage electrical enclosure 84. End walls 80 include a recessed area 86 and a knockout aperture 88 through which pre-wired cable 26 extends. Flexible cord 70 includes an electrical plug 90 at its end.

Figure 4:
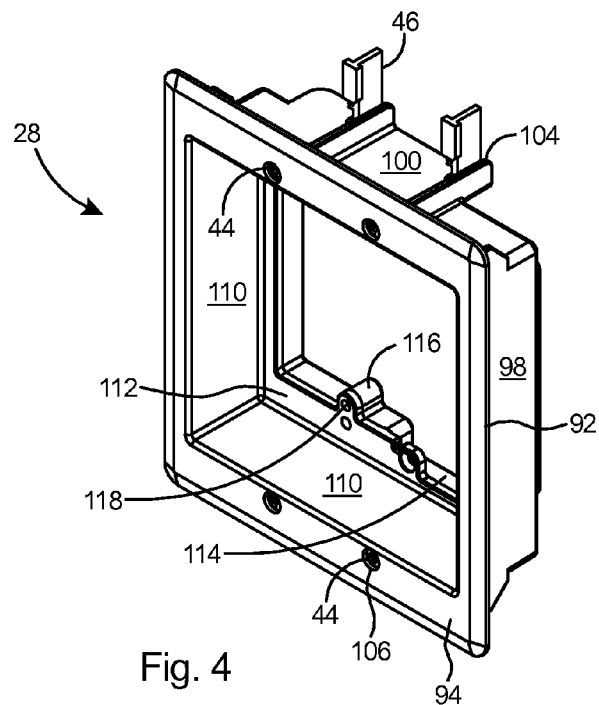
FIG. 4 is a front perspective view of a trim plate that forms a portion of the two-gang pre-wired TV bridge kit of FIG. 1.
Figure 5:
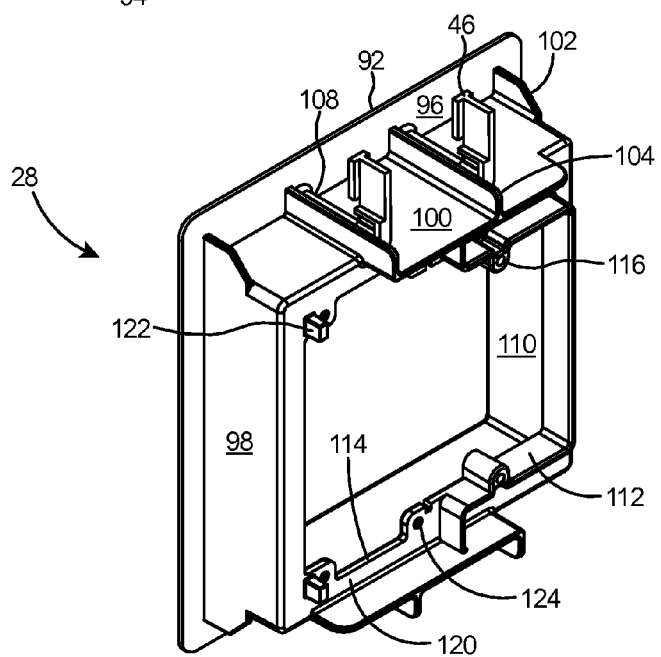
FIG. 5 is a rear perspective view of the trim plate.

With reference to FIGS. 4 and 5, trim plate 28 includes a flange 92 with a front surface 94 and a rear surface 96. Side walls 98 and end walls 100 extend from the interior portion of the rear surface 96. Short rails 102 extend from the flange 92 along the end walls 100 at the junction of side walls 98 and a pair of long rails 104 are located interior of the short rails 98 and extending from the flange 92 along the end walls 100. Apertures 106 pass through the flange 92 and through bosses 108 integral with the rear surface 96 of the flange 92 and with the end walls 100. Flag screws 44 pass through the apertures 106 and are secured to rotatable flags 46.

End walls 100 and side walls 98 of electrical box 28 (see FIG. 2) and trim plate 28 include interior surfaces 110 (see FIGS. 4 and 5) that extend to a low voltage side 112 and to a high voltage side 114. Low voltage side 112 includes two bosses 116 on opposing sides of the end walls 100 with apertures 118 therein for mounting of a low voltage component (not shown). High voltage side 114 includes planar mounting surface 120, posts 122, and apertures 124 extending into planar mounting surface 120. The depth of interior surfaces 110 recess the low voltage side 112 and high voltage side 114 well below the flange 92, which will insure that any low and high voltage components secured in the second box will be recessed well within the wall.

Referring to FIGS. 6 and 7, the side walls 98 and end walls 100 of trim plate 28 are each tapered from their juncture 125 with flange 92 to their rear edges. As shown in FIG. 6, long rails 104 are tapered from a wider base 126 at the juncture with the flange 92 to narrower at their ends 128 as shown by distance D1 compared to distance D2. Similarly, as shown in FIG. 7, end walls 100 taper from a wider base 130 at the juncture with the flange 92 to narrower at their rear edge 128 as shown by distance D3 compared to distance D4. The tapered long rails 104 and end walls 100 will make it easier for an installer to insert the trim plate 28 into an opening in the wallboard.

FIGS. 9a-9c illustrate the installation sequence of the two-gang pre-wired TV bridge kit of the present invention to form a bridge between a pre-wired receptacle and an existing wall outlet. Flat panel TVs are commonly mounted on a wall. One problem commonly encountered in this situation is that the nearest existing wall outlet may be located a substantial distance from the desired mounting location of the TV. In the conventional method of installing an in-wall electrical outlet box, the homeowner is thus faced with the task of pulling cable through the wall from the nearest available existing outlet and routing it to the location selected for the new TV. This distance may be 8 to 10 feet or more and therefore requires routing wire horizontally through several wall studs. This is a time consuming task that involves removal of the wallboard, drilling holes through the existing wall studs, pulling electrical cable through the newly drilled holes, and then repairing the damaged wallboard and the wall surface. This is a tremendously time consuming task that, as a result of all the wall damage, is also expensive. When faced with this task, a typical homeowner typically hires a qualified electrician to install the new receptacle.

The two-gang pre-wired TV bridge kit of the present invention provides a means for the homeowner to install his own power receptacle while at the same time providing a means for also routing low voltage cables to the TV. Modern TVs typically require one or more low voltage connections such as a CATV cable, cables for surround sound, and cables for connection to peripheral devices such as video games, DVRs, and disc players. The bridge kit of the present invention provides the means for routing a plurality of low voltage cables to the newly installed TV.

With reference to FIG. 9a, first electrical box 22 and trim plate 28 both include a low voltage passageway 131 therein for passage of low voltage cables (not shown) there through in order to supply first electrical box 22 with low voltage connections. To operate the two-gang bridge kit 20 of the present invention, two rectangular holes are cut in the wallboard, locating the top hole 132 at a desired location for a TV. The bottom hole 134 is located directly below the top hole, preferably low on the wall. The pre-wired junction box assembly or second electrical box 24 including prewired cable 26, flexible cord 70, and plug 90, is placed through the top hole 132 and fed down toward the bottom hole 134. If desired, as shown in FIG. 9b, a flexible insert 38 may be inserted in each of the low voltage passageways 131 to provide a more attractive TV bridge kit.

Figure 8:
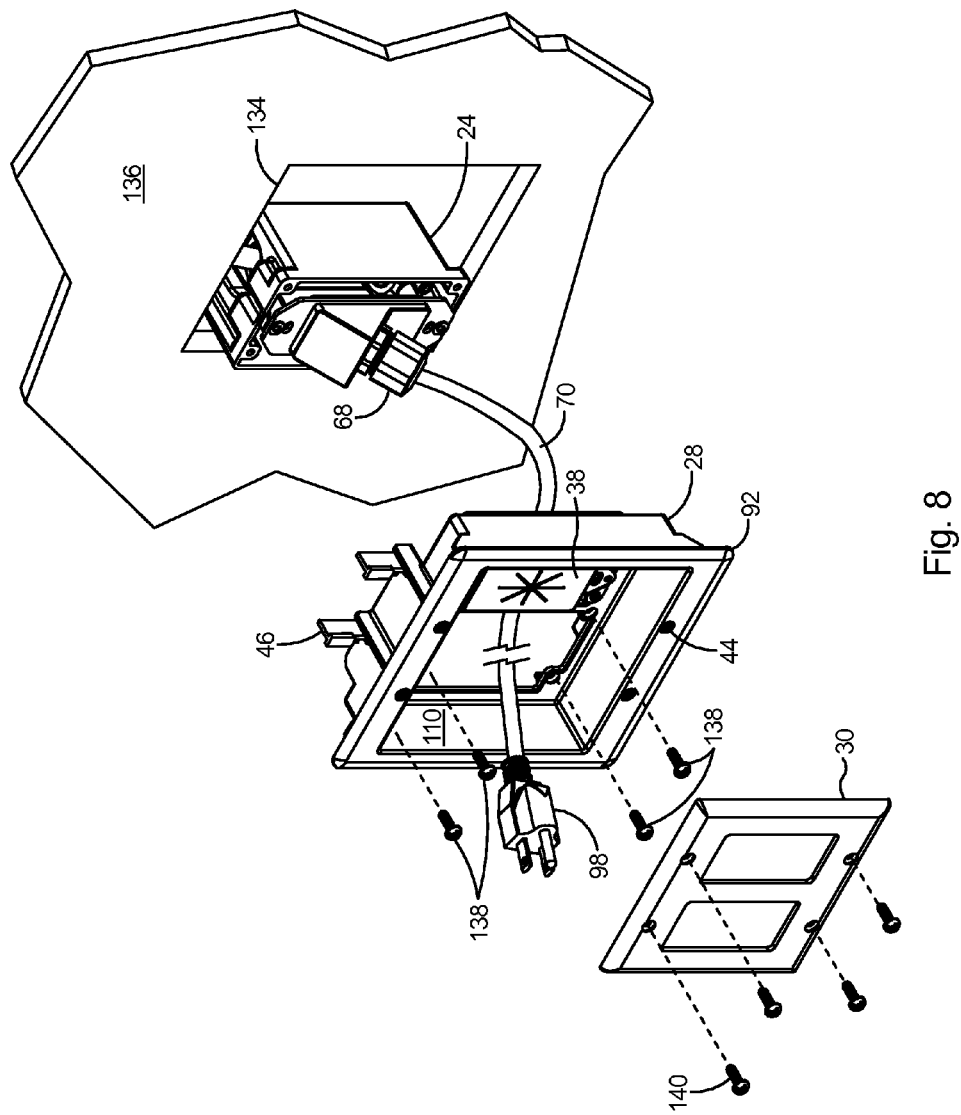
FIG. 8 is a perspective view of the pre-wired junction box with cord grip and flexible cord in alignment with a trim plate and cover plate to be secured to the wallboard.

As shown in FIG. 9b, first electrical box 22 is then pressed into the top hole 132 until flange 40 is flush with the surface of the wallboard 136 and the flag screws 44 are tightened to secure the first box 22 to the wallboard. As shown in FIG. 8, the second electrical box 24 and flexible cord 70 are then pulled through the bottom hole 134 and flexible cord 70 is pulled through the trim plate 28. The junction box 24 is secured to the trim plate 28 with trim plate screws 138 after which the trim plate 28 is secured to the wallboard 136 by tightening the flag screws 44. The cover plate 30 is then secured to the trim plate 28 with cover plate screws 140 as shown in FIG. 9b.

As shown in FIG. 9c, after both electrical box assemblies 22 and 24 are secured to the wallboard with flag screws 44, the pre-wired TV bridge 20 is simply plugged into an existing wall outlet 142. The flexible cord 70 of the TV bridge 20 can be of a length to accommodate a wall outlet 142 that is a substantial distance from the new location of the TV mount.

After the flexible cord 70 is plugged into outlet 142, electrical supply is reverse fed from the existing wall outlet 142 to all the components of the TV bridge 20, including the junction box 24 and the first electrical box 22. This is contrary to conventional electrical installations, in which electrical supply is routed from existing boxes that are behind the wall surface.

A flexible insert 38 may be secured to the low voltage mount 112 (see FIG. 4) of trim plate 28 to provide a pathway for low voltage wiring (not shown) to be routed between the first electrical box 22 and second electrical box 24. Low voltage cables are simply passed through the flexible insert 38 on first electrical box 22 and are dropped down behind the second electrical box 24 and pulled through the flexible insert 38 that is secured to the trim plate 28. This can be done during installation, as shown in FIG. 9a, or can be done later by simply loosening flag screws 44 and removing the trim plate 28 from the wallboard or wall 136 and then retrieving the low voltage cables from the wall cavity behind bottom hole 134 and passing them through the flexible insert 38 in the trim plate 28. Trim plate 28 is then reattached to the wall by retightening the flag screws. As shown in FIG. 2, flexible insert 38 includes a center aperture 146 and a plurality of slits 148 radiating from the center aperture.

As described hereinabove, the TV bridge vastly simplifies the task of supplying electricity to a newly installed TV or other electrical device. It eliminates the need to tear up walls by removing wallboard, to drill holes through studs, and to repair the damaged wall. Only two simple holes are required to be made in the wallboard and the TV bridge completely eliminates the messy and time-consuming job of drilling holes in wall studs, pulling electrical cable through the studs, and replacing wallboard and finishing the wall.

As both of the electrical boxes 22 and 24 are pre-wired, there is no need for the installer to make any internal wiring connections within the electrical boxes. Flexible cord 70 could be substantially long, such as 8 feet in length or even longer, to enable an installer to reach a substantially distant existing electrical outlet. If, for example, the existing electrical outlet is 8 feet away from the second electrical box 24, and wall studs (not shown) are spaced at 16-inches, the pre-wired TV bridge kit 20 of the present invention eliminates the need to remove a substantial amount of wallboard and the need to drill through 6 studs. The two-gang pre-wired TV bridge kit 20 thereby provides a means of supplying line voltage to a TV or similar electrical appliance or device without the need to tear up existing walls and to drill holes in the studs and pull cables there through.

As shown in FIG. 2, the recessed area 64 on second electrical box 24 may include a knockout or removable wall portion 66. The recessed area 64 enables the use of electrical fittings or connectors such as the Black Button™ push-in fitting 144 or connector for connecting non-metallic cable to electrical boxes. The Black Button™ push-in fitting is available from Arlington Industries of Scranton, Pa. Use of the push-in fitting 144 prevents any part of the fitting from projecting beyond the end walls 80 and interfering with placement of the two-gang pre-wired TV bridge kit in locations where space is tightly restricted.

Various portions of the two-gang pre-wired TV bridge kit 20, including the first and second electrical boxes 22 and 24, may be constructed of metal or plastic. Most preferably, the electrical boxes 22 and 24, the trim plate 28, and the cover 30 are each molded in one piece of plastic. Suitable plastics include polycarbonate and polyvinylchloride.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A two-gang pre-wired TV bridge kit comprising:
    a first pre-wired electrical box including a high voltage side and a low voltage side;
    a second pre-wired electrical box including a trim plate having a high voltage side and a low voltage side;
    a pre-wired receptacle in said high voltage side of said first electrical box;
    a flexible electrical cord secured in a tamper-proof fit to said second electrical box;
    an electrical cable extending between said high voltage side of said first electrical box and said second electrical box;
    a low voltage passageway in said low voltage side of said first electrical box and in said trim plate, said low voltage passageway enabling routing of low voltage cables between said low voltage side of said first electrical box and said low voltage side of said trim plate; and
    a flexible insert secured to said low voltage side of said first electrical box and to said low voltage side of said trim plate.

2. The two-gang pre-wired TV bridge kit of claim 1 including
    a cord grip secured to said second electrical box; and
    said flexible electrical cord is secured said cord grip.

3. The two-gang pre-wired TV bridge kit of claim 2 wherein
    said second electrical box includes a front face; and
    said cord grip includes a cord grip mount.

4. The two-gang pre-wired TV bridge kit of claim 3 wherein said cord grip mount includes a 45° surface for angling said cord grip at a 45° angle with respect to said front face of said second electrical box.

5. The two-gang pre-wired TV bridge kit of claim 1 including
    a flange on said first electrical box and a flange on said trim plate;
    mounting fasteners extending through said flanges; and
    rotatable flags attached to said mounting fasteners.

6. The two-gang pre-wired TV bridge kit of claim 5 wherein
    said first electrical box and said trim plate include end walls, side walls, and interior surfaces a substantial depth within said end walls and side walls; and
    said depth of said interior surfaces recess said low voltage side and said high voltage side well below said flanges of said first electrical box and said trim plate.

7. The two-gang pre-wired TV bridge kit of claim 6 wherein said trim plate includes short rails and long rails extending from said end walls.

8. The two-gang pre-wired TV bridge kit of claim 6 wherein
    said end walls of said trim plate include a juncture with said flange and rear edges; and
    said end walls of said trim plate are tapered from a wider base at their juncture with said flange to narrower at said rear edges.

9. The two-gang pre-wired TV bridge kit of claim 6 wherein
    said long rails of said trim plate include a juncture with said flange and ends; and said long rails of said trim plate are tapered from a wider base at their juncture with said flange to narrower at said ends.

10. The two-gang pre-wired TV bridge kit of claim 1 wherein said trim plate includes
   side walls and end walls;
   said low voltage side of said trim plate includes bosses on opposing sides of said end walls; and
   apertures in said end walls for receipt of fasteners for mounting of a low voltage component.

11. The two-gang pre-wired TV bridge kit of claim 1 wherein said high voltage side of said trim plate includes a planar mounting surface and apertures extending into said planar mounting surface.

12. The two-gang pre-wired TV bridge kit of claim 11 wherein said high voltage side of said trim plate includes posts extending from said planar mounting surface of said high voltage side of said trim plate.

13. The two-gang pre-wired TV bridge kit of claim 1 wherein
   said flexible insert includes a center aperture; and
   a plurality of slits radiating from said center aperture.

14. The two-gang pre-wired TV bridge kit of claim 1 wherein
   said second electrical box includes an end wall and a recessed area in said end wall; and
   a knockout wall portion in said recessed area.

15. The two-gang pre-wired TV bridge kit of claim 14 wherein said recessed area includes an electrical fitting therein.

\* \* \* \* \*